(12) United States Patent
Mandal et al.

(10) Patent No.: US 11,630,900 B2
(45) Date of Patent: Apr. 18, 2023

(54) DETECTION OF MALICIOUS SCRIPTED ACTIVITY IN FILELESS ATTACKS

(71) Applicant: McAfee, LLC, San Jose, CA (US)

(72) Inventors: Debasish Mandal, Bangalore (IN); Abhishek Karnik, Hillsboro, OR (US)

(73) Assignee: McAfee, LLC, San Jose, CA (US)

(*) Notice: Subject to any disclaimer, the term of this patent is extended or adjusted under 35 U.S.C. 154(b) by 622 days.

(21) Appl. No.: 16/588,159

(22) Filed: Sep. 30, 2019

(65) Prior Publication Data

US 2021/0097186 A1 Apr. 1, 2021

(51) Int. Cl.
*G06F 21/57* (2013.01)
*G06F 9/54* (2006.01)
*G06N 20/00* (2019.01)

(52) U.S. Cl.
CPC .............. *G06F 21/577* (2013.01); *G06F 9/54* (2013.01); *G06N 20/00* (2019.01)

(58) Field of Classification Search
CPC .......... G06F 21/577; G06F 9/54; G06N 20/00
See application file for complete search history.

(56) References Cited

U.S. PATENT DOCUMENTS

| | | | |
|---|---|---|---|
| 10,581,888 B1* | 3/2020 | Agranonik | H04L 63/1425 |
| 10,671,726 B1* | 6/2020 | Paithane | H04L 63/1416 |
| 10,956,477 B1* | 3/2021 | Fang | G06F 40/30 |
| 11,010,472 B1* | 5/2021 | Powers | G06K 9/6272 |
| 2010/0186088 A1* | 7/2010 | Banerjee | G06F 21/56 |
| | | | 709/224 |
| 2011/0173142 A1* | 7/2011 | Dasgupta | G06N 20/00 |
| | | | 709/206 |
| 2015/0013008 A1* | 1/2015 | Lukacs | G06F 21/53 |
| | | | 726/24 |
| 2015/0101052 A1* | 4/2015 | Ledenev | G06F 21/566 |
| | | | 726/24 |
| 2015/0363598 A1* | 12/2015 | Xu | G06F 21/563 |
| | | | 726/23 |
| 2018/0097829 A1* | 4/2018 | Muttik | G06F 21/6245 |
| 2018/0278554 A1* | 9/2018 | Kassabgi | G06F 40/56 |
| 2019/0132355 A1* | 5/2019 | Egbert | H04L 63/1466 |
| 2019/0173900 A1* | 6/2019 | Safruti | H04L 63/1425 |
| 2019/0318100 A1* | 10/2019 | Bhatia | G06F 21/57 |
| 2020/0004963 A1* | 1/2020 | Zheng | G06F 21/566 |
| 2020/0177613 A1* | 6/2020 | Nilangekar | G06F 21/577 |
| 2020/0249972 A1* | 8/2020 | Toy | G06F 9/5077 |
| 2021/0390183 A1* | 12/2021 | Usui | G06F 21/563 |

* cited by examiner

*Primary Examiner* — Darshan I Dhruv
(74) *Attorney, Agent, or Firm* — Patent Capital Group

(57) ABSTRACT

There is disclosed in one example a computing apparatus, including: a processor and memory; and instructions encoded within the memory to instruct the processor to: identify a scripted process for security analysis; hook application programming interface (API) calls of the scripted process to determine a plurality of pre-execution parameters and runtime parameters; assign individual scores to the pre-execution parameters and runtime parameters; compute a sum of the individual scores; compare the sum to a threshold; and detect malicious or suspicious activity if the sum is above the threshold.

20 Claims, 10 Drawing Sheets

DETECTION OF MALICIOUS SCRIPTED ACTIVITY IN FILELESS ATTACKS

FIELD OF THE SPECIFICATION

This application relates in general to computer security, and more particularly, though not exclusively, to a system and method for providing detection of malicious scripted activity in fileless attacks.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
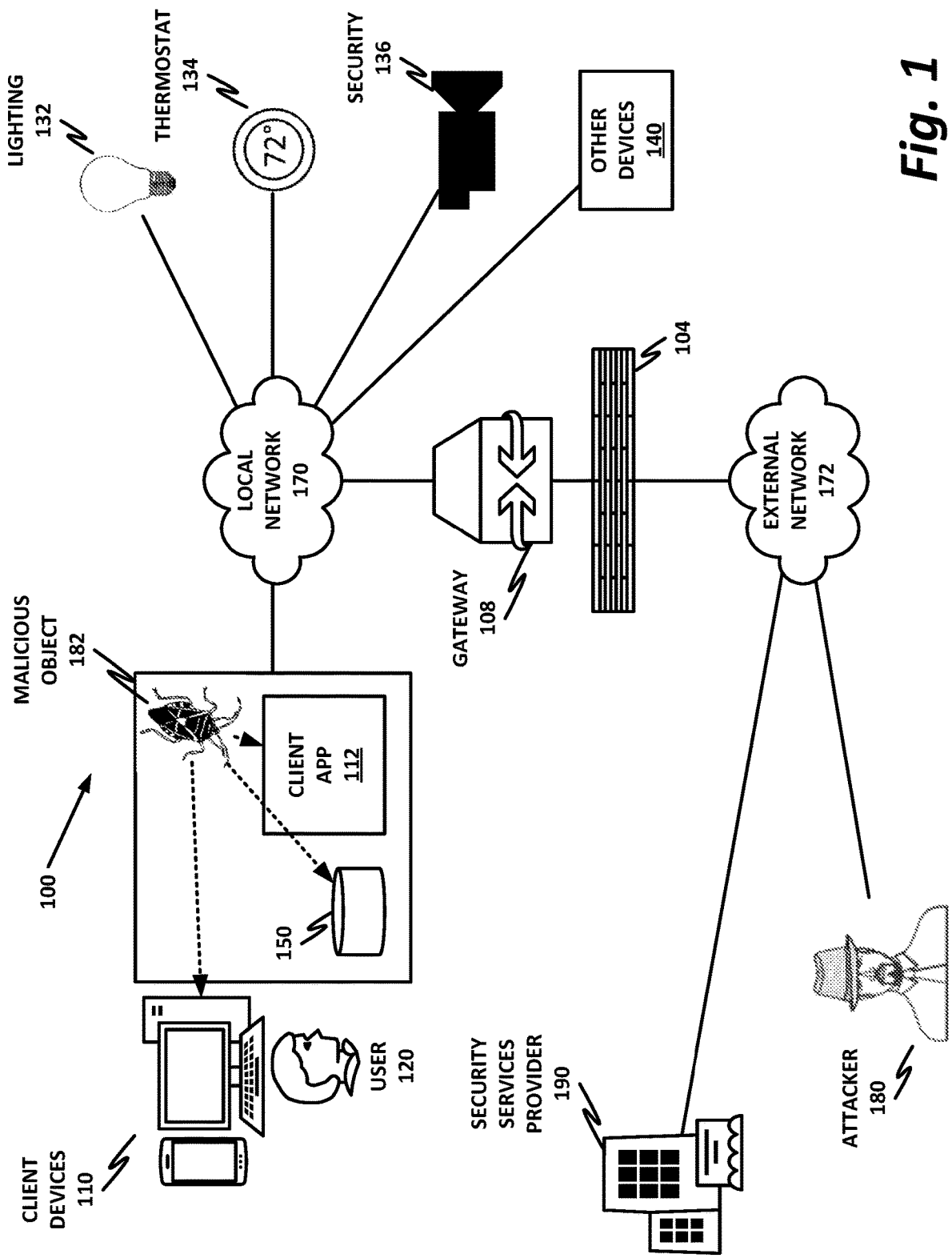
FIG. 1 is a block diagram of selected elements of a security ecosystem.

In an example, there is disclosed a computing apparatus, comprising: a processor and memory; and instructions encoded within the memory to instruct the processor to: identify a scripted process for security analysis; hook application programming interface (API) calls of the scripted process to determine a plurality of pre-execution parameters and runtime parameters; assign individual scores to the pre-execution parameters and runtime parameters; compute a sum of the individual scores; compare the sum to a threshold; and detect malicious or suspicious activity if the sum is above the threshold.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Malicious scripts, such as malicious PowerShell scripts on Microsoft Windows operating systems, are a key ingredient to many fileless malware attacks. Windows PowerShell is a built-in tool based on the .Net framework comprising a command line shell, an interface that lets users access services of the operating system, and a programming language that can be used to create scripts. Endpoint security products already have signatures in place that attempt to prevent malicious activity while using PowerShell. For example, the following command line represents a PowerShell payload generated using the Veil framework. Veil is an open source malware framework that is popular among computer attackers. The example command line is:

powershell.exe-NoP-NonI-W Hidden-Exec Bypass-Command "Invoke-Expression$(New-ObjectIO.StreamReader($(New-ObjectIO Compression.De flateStream($ (New-ObjectIO.MemoryStream(,$([Convert]::FromBase64Stri ng("snipped . . . ")))),[IO.Compression.CompressionMode]::Decompress)),[Te xt.Encoding]::ASCII)).ReadToEnd( );"

Some existing endpoint security products are designed to filter command line arguments of the PowerShell process. Those products may block the above-mentioned attack payload. But the decision may be based, in some examples, on a single check. For example, the use of Hidden Mode (-W Hidden switch) or NoPolicy (-NOP) or Execution Bypass (-Exec Bypass) may be included in a list of flags that are monitored by an endpoint security product. When the endpoint security product detects any of these flags, the script may be flagged as suspicious, and execution may be blocked, at least until a local or enterprise security administrator can evaluate the script to determine whether it is legitimate.

While flagging on individual command line parameters is useful for detecting and mitigating fileless attacks, it may also result in a substantial number of false positives. For example, there may be many scenarios where a legitimate PowerShell user may want to execute PowerShell in Hidden Mode. Indeed, if there were no legitimate uses for it, there would be little point in PowerShell including a Hidden Mode switch. The same could be said for NoPolicy and Execution Bypass, and other similar flags that may trigger endpoint security detection.

In those scenarios, the alert generated by the feature is treated as a false positive by the user or security administrator. Unfortunately, when users or security administrators encounter a large number of false positives, they may simply disable the PowerShell signatures that include those flags that are triggering the false positives. While this eliminates the false positives, it also inhibits the ability of the endpoint security agent to detect fileless attacks on the system.

The problem of false positives triggered by individual flag detection can be mitigated by an endpoint security agent that integrates with global or enterprise security features to provide more sophisticated scanning of command line arguments and other behavior scanning. In some embodiments, the decision of blocking or allowing a PowerShell process at the endpoint may rely on correlating multiple behaviors seen in a PowerShell process, including both the command line itself, and behavior observed during execution.

By correlating a plurality of behaviors, the number of false positives can be reduced, while the number of correct positive detections can remain high. In some embodiments, correlation can include correlating the use of a plurality of command line flags, with thresholds that can be computed on a per-enterprise basis. For example, one particular enterprise may be more likely to use the flag NoPolicy (-NOP) than another enterprise. In an enterprise where the NoPolicy flag is commonly used, it has limited value in identifying malware. However, the use of Hidden Mode in that same enterprise may be more indicative of a fileless attack. Furthermore, the use of Hidden Mode in combination with NoPolicy and Execution Bypass may be highly indicative of a fileless attack.

In at least some embodiments, the correlation of one or a plurality of command line arguments can be used to assign an initial score for the process. This initial score may or may not be used to definitively determine that the process is malicious. In some embodiments, the initial score is used to weight the process more or less heavily toward being malicious. This weighting factor can then be used in conjunction with an execution behavior analysis to determine a more definitive malware score. The malware score may be compared to a threshold to determine whether detection should be triggered. In some embodiments, the threshold itself may be self-adjusting according to heuristic or machine learning models that analyze behavior across the enterprise, and that also account for action taken in response to warnings, such as whether a warning is dismissed or acted upon by the end user or a security administrator.

At least some embodiments of the present specification include a behavior correlation model. Behavior correlation can be used to make decisions of whether to block or allow a PowerShell process at the endpoint. This behavior correlation may not be based on a single behavior, but rather the decision may be based on correlating several behaviors seen in a PowerShell process. This correlation of a plurality of factors brings enhanced reliability to the detection mechanism.

Embodiments may also provide reliable behavior logging through custom API hooking. Events occurring inside a process can be logged in several ways. These logging mechanisms are, however, generally not reliable enough to be considered trustworthy in endpoint malicious activity detection. Thus, embodiments of the present specification use the endpoint security agent's custom API hooking ability to hook into custom Windows or other operating system APIs. The hooks may log certain events occurring inside a running process. In some examples, the logging is performed in the most generic way available, so that obfuscation by malicious processes has minimal impact on logging.

Embodiments of the present specification also use machine learning algorithms to establish a security baseline. The detection mechanism illustrated herein may use machine learning to establish an endpoint-specific security baseline. This security baseline can be adjusted over time as behavioral models are observed, including observing the reaction of the endpoint user or security administrator to detection activities.

The system and method described herein realize advantages over existing endpoint detection systems. Those endpoint detection systems may effectively identify malicious payloads using command line filters. However, simple command line filtering with single match triggering may result in a substantial number of false positives. An overabundance of false positives can, in some cases, be as dangerous as no detection at all. When the number of false positives becomes excessive, users or security administrators may disable certain detections, which in effect leaves the machine as vulnerable as if it had no detection capability in the first place.

Thus, at least one advantage of the system and method described in the present specification is behavior correlation. Using behavior correlation, the decision to block or allow a PowerShell (or other scripted) process at the endpoint need not be based on a single behavior. The decision may be taken based on correlating several behaviors seen in the process. This brings greater reliability to the detection mechanism, while eliminating a substantial number of false positives.

A system and method for providing detection of malicious scripted activity in fileless attacks will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Malicious object 182 may, in some examples, be a fileless or "living off the land" style attack. For example, malicious object 182 may attack client device 110 by adding a scheduled task to the Windows Task Scheduler, or a Windows Management Instrumentation (WMI) object. The scheduled task may be scheduled to launch a Windows PowerShell process. The Windows PowerShell process may, for example, run in Hidden Mode, NoPolicy Mode, and/or with Execution Bypass. In some examples, the PowerShell script downloads data from an external website and installs other objects, such as registry entries with Base64 encoding, other scheduled tasks, WMI processes, PowerShell scripts, and similar. Thus, malicious object 182 may achieve persistence without installing any individual files on user device 110.

Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects may be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™)

database provided by MCAFEE, LLC or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
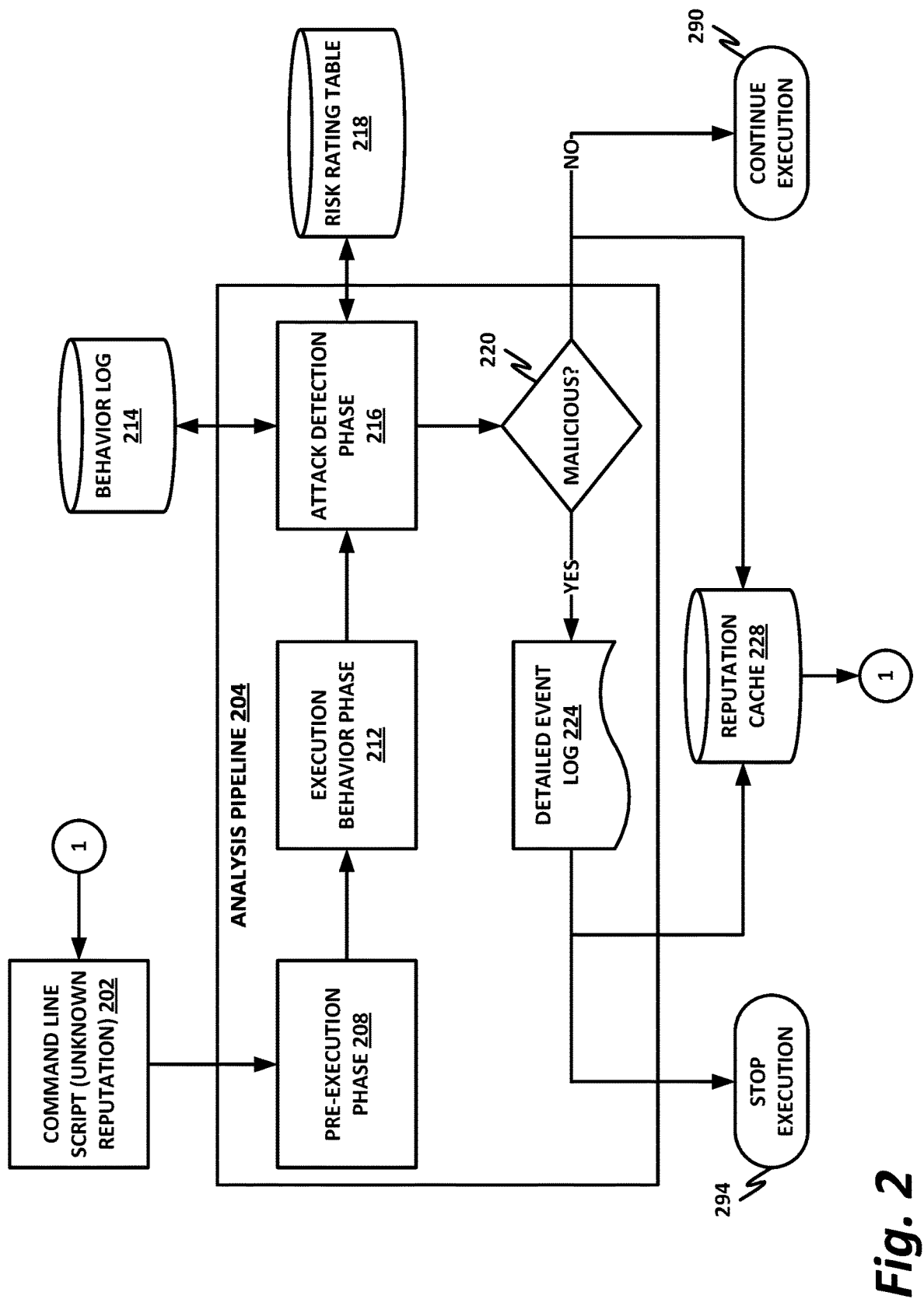
FIG. 2 is a block diagram of selected elements of an analysis pipeline.

FIG. 2 is a block diagram of selected elements of an analysis pipeline 204, which can be used to analyze a process such as a Windows PowerShell command line or other command line script to determine if the process is part of a "living off the land" style attack.

In its entire lifespan, a PowerShell process such as command line script 202 may drive hundreds or thousands of events. Thus, in the system and method of the present specification, analysis pipeline 204 may be part of a larger security engine. The security engine may include hardware, software, firmware, or any combination thereof, and in at least some embodiments, may include computer executable instructions encoded on a transitory or non-transitory computer-readable medium. The instructions, when executed, may instruct the processor to perform the operations of the security agent, including providing analysis pipeline 204. Analysis pipeline 204 provides a PowerShell (or other command line) behavioral correlation signature to log behavior within the PowerShell process. Based on the behavior log, analysis pipeline 204 may come to a conclusion of whether the process is trying to perform any malicious or other unsafe activity. Behaviors may be mapped to a score table, where a score is defined based on the risk associated with a particular behavior. While the PowerShell script execution continues, a machine learning feature may continue to calculate an overall nature of the process by continuing to add behavior scores logged at each time period.

In some embodiments, a signature may also have an associated score threshold. By comparing the signature to a score threshold, the security engine may determine whether the PowerShell, or other command line process, is malicious in nature. Depending on the score, the severity of the threat, and configurable options that may be configured by a user and/or a security administrator, the security engine may make a decision of whether to block the process, allow the process, provide a warning, or provide some other security action.

The threshold for detection may vary between different enterprises, and across various endpoints within an enterprise. The threshold may depend on the purpose of the workstation, heuristic analysis of the user or operator's behavior, and other factors. In some embodiments, the threshold is dynamic. The behavior and score log may be fed into a machine learning algorithm to fine-tune the threshold. In some embodiments, threshold adjustment is a continuous and autonomous process that requires little or no intervention from a human actor.

In an illustrative embodiment, a command line script 202 with an unknown reputation begins to execute within the endpoint. This command line script 202 is provided to an analysis pipeline 204. Analysis pipeline 204 includes a series of operations that may be applied to the command line script, both before execution and during execution, to analyze its behavior. Analysis pipeline 204 includes a number of operations that are not required in every embodiment. In general, the elements disclosed in the block diagram of analysis pipeline 204 should be understood to be illustrative embodiments, and unless otherwise stated, no specific element is required in every embodiment.

Within analysis pipeline 204, a pre-execution phase 208 first receives the command line script 202 with the unknown reputation. Pre-execution phase 208 may analyze the command line itself for suspicious factors. This could include looking for suspicious flags or operations, such as execution with no profile, execution in Hidden Mode, a non-interactive PowerShell, an encoded command (e.g., encoded within Base64), execution policy bypass attempt, Invoke-Expression, and/or a suspicious parent process. As noted above, in some existing solutions, any one of these flags or factors may be deemed per se suspicious, and may trigger a detection. However, because there are many legitimate uses for each of these flags and solutions, per se triggering may result in a substantial number of false positives, which ultimately may result in the detection being disabled. This can lead to a situation where the endpoint is exposed to substantial risk, because detection has been disabled. In some embodiments, pre-execution phase 208 may use an enterprise or endpoint-specific model to determine a cross-section of options that are more or less specific. For example, each factor may be assigned a particular value. The score for a particular command line may then include a sum of the factors for the individual scores.

In an illustrative embodiment, within pre-execution phase 208, PowerShell.exe sets up those things required for script execution. This could include, by way of illustrative example, argument parsing, checks environment, execution policy, and similar. In some cases, several important tasks may need to take place for smooth execution of the PowerShell code. One of the major tasks is command line argument parsing.

Pre-execution phase 208 may provide feature hooks into some Windows APIs. By way of illustrative and nonlimiting example, hooked APIs may include the following:

TABLE 1

| Hooked APIs | |
| --- | --- |
| Enter_Handler SysAllocString | For intercepting passed command line arguments |
| Enter_Handler WinHttpGetProxyForUrl | To detect HTTP Communication and File download attempt |
| Enter_Handler ShowWindow | To reliably detect when anyone trying to hide PowerShell |
| Enter_Handler SetEnvironmentVariableW | To reliably detect manipulation of execution policy of PowerShell |
| Enter_Handler RegSetValueExW | To reliably detect manipulation of execution policy of PowerShell |
| Enter_Handler LoadLibraryA | To Detect Anti-Malware Scan Interface (AMSI) Bypass attempt |
| Enter_Handler GetModuleHandleA | To Detect AMSI Bypass attempt |
| Enter_Handler GetProcAddress | To Detect AMSI Bypass attempt |

From pre-script execution stage logs, several important behaviors may be inspected within memory. Some events captured in this stage include, by way of illustrative and nonlimiting example:

TABLE 2

PowerShell Pre-Script Execution Events

No Policy
Non-Interactive PowerShell
Hidden Mode PowerShell
Encoded Command
Execution Policy Bypass Attempt
Invoke-Expression
Parent Process Details Pre-execution phase 208 may provide a preliminary score to be associated with command line script 202. This preliminary score may include a degree of suspiciousness based on a sum of individual scores provided within pre-execution phase 208.

Depending on the embodiment, detection could be triggered from this phase alone. For example, if the sum is high enough (or, in other words, if enough factors are present within pre-execution phase 208, and those factors are severe enough), then detection may be triggered, and verification may be required before the script is allowed to execute. In at least some embodiments, if the intermediate score from pre-execution phase 208 is low enough (e.g., zero, or close to zero), then the script may be allowed to execute without further interference. Furthermore, in some embodiments, if the intermediate score from pre-execution phase 208 is within a threshold range, then command line script 202 may proceed along analysis pipeline 204. For example, if the intermediate score from pre-execution phase 208 is high enough to not be deemed safe, but not high enough to be deemed per se suspicious, then analysis may proceed to execution behavior phase 212.

After the script is set up within pre-execution phase 208, within execution behavior phase 212, script execution starts. Analysis pipeline 204 may hook into some APIs, for example Windows APIs, to log different events. Events logged could include, by way of illustrative and nonlimiting example:

TABLE 3

Events During PowerShell Script Execution

Communicate via HTTP
Downloads Known Malware
Downloads Malicious PostScript File
Attempt to Bypass AMSI Again, there are legitimate reasons that a script may need to perform any one of these operations. It is therefore not optimal in at least some embodiments to trigger detection based on the presence of only one of these factors. For example, communication over nonsecured HyperText Transfer Protocol (HTTP) instead of HyperText Transfer Protocol Secure (HTTPS) is generally disfavored in contemporary practice, because communications are not encrypted and are therefore not secured. Malware authors may use HTTP communication, because it can be expensive and sometimes not possible for them to receive proper transport layer security (TLS) certificates for HTTPS communication. These malicious communications may therefore default to HTTP. However, it is also possible that an HTTP communication simply represents a case where an enterprise or a server has not yet been updated to contemporary best practices. Similarly, executable (EXE) and PostScript files containing executable code may have many legitimate purposes when downloaded within a script. They could also represent malicious activity. There are similar legitimate and non-legitimate use cases for opening remote processes, creating remote threads, attempting reflective image loading, or executing from a temporary file.

Within execution behavior phase 212, events occurring within the PowerShell may be logged in several different ways. However, these logging mechanisms may not be reliable in themselves, and are usually generic in nature. Execution behavior phase 212 may therefore attempt to log all events occurring inside a running process in the most generic way available. This helps to ensure that command line obfuscation has little impact on the logging.

For example, it may be desirable to detect a Hidden Mode PowerShell. PowerShell can be launched in Hidden Mode in many ways, and the malicious actor may attempt various different ways to obfuscate his use of PowerShell Hidden Mode. The security actor therefore has a number of different ways available to detect that the PowerShell was launched in Hidden Mode. A popular way to do this detection is to use a signature or token-based detection in the command line argument passed to the PowerShell process. However, there are many ways that command line arguments of PowerShell processes can be obfuscated. A token or signature-based detection approach may therefore make it difficult to log the behavior.

Thus, in some embodiments, rather than relying on string-based checks, execution behavior phase 212 may hook into an operating system (e.g., Windows) API. In a Windows operating system, to launch PowerShell in Hidden Mode, the PowerShell process calls the Windows API ShowWindow (User 32.dll) with the arguments ShowWindow(hWnd, SW_HIDE). No matter how the attacker obfuscates the command line arguments, PowerShell uses the ShowWindow(x, x) API to hide the PowerShell window. This can therefore be detected at pre-execution phase 208 and/or within execution phase 212. Analysis pipeline 204 can therefore successfully log the attempt to open PowerShell in Hidden Mode without false negatives that may occur from the use of string-based parsing of command line arguments. A similar hooking of APIs can be used to detect various events within Table 1 and Table 2.

In the specific example of policy bypass attempts, detection may occur if a hook is set into the SetEnvironmentVariableW( ) API.

In some embodiments, an intermediate score may be assigned by execution behavior phase 212. This score can be combined with the score of pre-execution phase 208. Note that not all embodiments apply per-phase intermediate scores.

In some embodiments, scores are assigned at attack detection phase 216.

The events described above may be mapped to a score table, where a score is defined based on the risk associated with the behavior. In an illustrative embodiment, a higher score means higher-risk behavior.

An illustrative high-level example of a risk rating table 218 includes:

TABLE 4

Behavior to Risk Rating Mapping Table

| PowerShell Pre-Script Execution Events | Score | Events During PowerShell Script Execution | Score |
|---|---|---|---|
| No Profile | 1 | Communication over HTTP | 1 |
| Non-Interactive PowerShell | 1 | ExE/PS Download Attempt | 3 |
| Hidden Mode | 2 | Remote Process Open | 2 |
| Encoded Command | 3 | Create Remote Thread | 2 |
| Execution Policy Bypass | 2 | Reflective Loading Attempt | 4 |
| Invoke-Expression | 3 | Execute File from Temp | 5 |
| Suspicious Parent Process | 3 | | |
| Command Line Obfuscation using Caret | 2 | | |

Yet another example, which may supplement the example above, or which may be used in its place, includes:

TABLE 5

Pre-Execution Behavior Scores

| Pre-Execution Behavior | Score |
|---|---|
| Caret Detected in Command Line | 6 |
| When EncodedCommand is used | 6 |
| When PowerShell is launched from Suspicious Parent | 4 |
| When PowerShell is launched in Hidden Mode | 3 |
| When Manipulate execuPolicy to Bypass | 2 |
| When Manipulate execuPolicy to Unrestricted | 2 |
| When Manipulate execuPolicy to RemoteSigned | 2 |
| When Invoke-Expression is used | 2 |
| When PowerShell Command Passed Through Command Line | 2 |
| When NoProfile is Used | 2 |
| When PowerShell is launched in Noninteract Mode | 2 |
| When Nologo is Used | 2 |
| When a PowerShell file is passed to PowerShell to execute | 2 |

TABLE 6

Execution Behavior Scores

| Execution Behavior | Score |
|---|---|
| When PowerShell Process Communicates Over HTTP | 6 |
| When PowerShell Process Downloads Malicious Executable | 8 |
| When PowerShell Process Downloads Malicious PS File | 8 |
| When PowerShell Process Tries to Bypass Antimalware Scan Interface (AMSI) | 16 |

Attack detection phase 216 therefore compares behaviors logged within behavior log 214, and queries risk rating table 218 for a score for each of those events. Note that the scores illustrated herein are provided for illustrative example only, and various embodiments may assign different scores to different factors. In some cases, the score itself may depend on the enterprise. For example, behavior that is suspicious in the context of one enterprise may be non-suspicious in the context of a different enterprise. Furthermore, behavior that is suspicious in both enterprises may be less suspicious in the first enterprise than in the second enterprise.

As execution of the PowerShell script continues, execution behavior phase 212 may continue to log behavior to behavior log 214. As new behaviors are logged to behavior log 214, attack detection phase 216 continues to analyze the updated events and assign scores to them. Risk rating table 218 may also include a threshold. If the signature assigned to command line script (e.g., a sum of behavior scores) exceeds the threshold, then attack detection phase 216 may tag command line script 202 as malicious or suspicious.

Decision module 220 receives a current signature, such as a sum of scores, from attack detection phase 216. Based on a threshold, such as a threshold stored within risk rating table 218, decision module 220 may determine whether command line script 202 is malicious or not. Note that malicious or not is provided by illustrative example, and in other examples, various gradations of threshold may be provided, such as a threshold for clean or white list, a threshold for gray or suspicious, and a threshold for black or malicious by way of illustrative and nonlimiting example.

If decision module 220 determines that command line script 202 is malicious, then it may provide a detailed event log 224, which can be used for later analysis. Detailed event log 224 can also be used by a machine learning algorithm to provide continuous updates to thresholds for various detections. At block 294, the security agent hosting analysis pipeline 204 may stop execution, or at least belay execution until the action is confirmed by a human user or security administrator. Detailed event log 224 could also be provided to a reputation cache 228, which can then provide a known reputation to command line script 202 the next time it is encountered.

If decision module 220 determines that the script is not malicious, then at 290, the security agent allows continued execution.

Applying analysis pipeline 204 to the illustrative command line from the Veil framework above, the command line is analyzed as follows:

powershell.exe-NoP-NonI-W Hidden-Exec Bypass-Command "Invoke-Expression$(New-ObjectIO.StreamReader($(New-ObjectIO. Compression.De flateStream ($(New-ObjectIO.MemoryStream(,$([Convert]:: FromBase64Stri ng("snipped . . . ")))), [IO.Compression.CompressionMode]::Decompress)), [Te xt.Encoding]::ASCII)).ReadToEnd( );"

With a PowerShell behavioral correlation feature in place, the event score mapping table may appear as follows:

TABLE 7

Event to Score Mapping with Behavioral Correlation (Pre-Script Execution)

| PowerShell Pre-Script Execution Events | Score |
|---|---|
| No Profile | 1 |
| Non-Interactive PowerShell | 1 |
| Hidden Mode | 2 |
| Encoded Command | 3 |
| Execution Policy Bypass | 2 |
| Invoke-Expression | 3 |
| Suspicious Parent Process | 3 |
| Command Line Obfuscation using Caret | 2 |

TABLE 8

Event to Score Mapping with Behavioral Correlation (During Script Execution)

| Events During PowerShell Script Execution | Score |
|---|---|
| Communication over HTTP | 1 |
| ExE/PS Download Attempt | 3 |
| Remote Process Open | 2 |
| Create Remote Thread | 2 |
| Reflective Loading Attempt | 4 |
| Execute File from Temp | 5 |

Adding up all the scores for behavior logged during the pre-execution phase and the execution phase, the Veil framework command line ultimately receives a score of 13. If, in this illustrative example, the threshold for detection of malice is set to 7, then the attempted operation from the Veil framework may be blocked. However, if a legitimate user executes PowerShell in Hidden Mode with execution policy bypass, the overall risk rating would be 2+2=4. Because 4 is lower than the threshold of 7 for malice detection, this operation may not be treated as a threat. This signature ultimately allows the process to continue.

Figure 3:
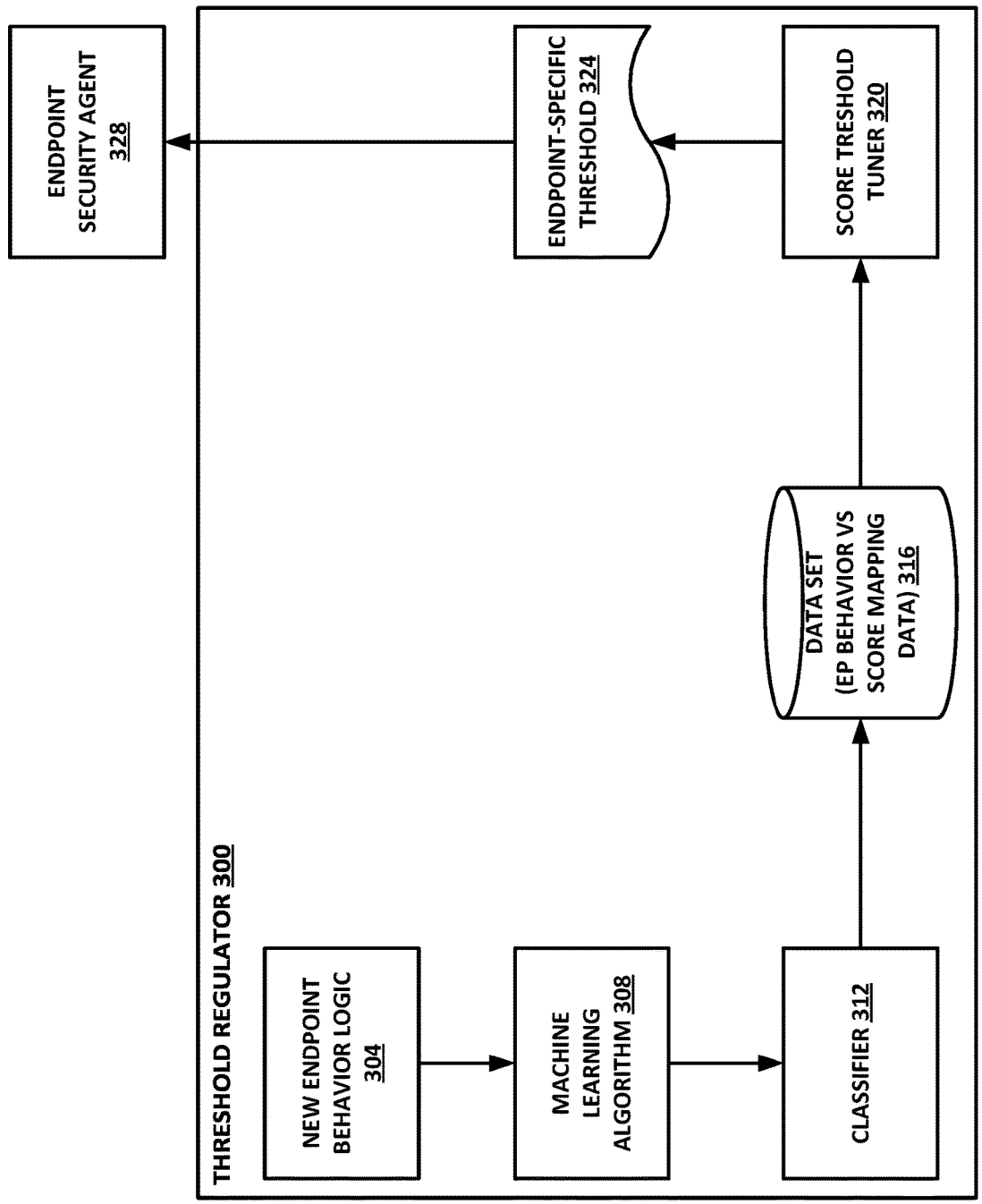
FIG. 3 is a block diagram illustration of a threshold regulator.

FIG. 3 is a block diagram illustration of a threshold regulator 300. Threshold regulator 300 may be used within a security agent to regulate or adjust thresholds for detection.

As discussed above, the decision of detecting or not detecting a scripted process may depend on the score threshold. In some embodiments, a signature or score is computed for the scripted object and compared to a threshold. Detection occurs only if the score is above a threshold. Decisions about whether to block, allow, warn, or take some other action may then depend on the value of the score or signature as compared to the threshold.

However, the optimal threshold may vary from one enterprise to another, and even across endpoints within the same enterprise. Consider, for example, a large organization. This large organization may have different types of endpoints, such as accounting, office support staff, engineering workstations, security administrators, systems administrators, and others. A PowerShell process risk rating or score may vary from endpoint to endpoint, depending on the purpose of the workstation. For example, a system administrator that frequently executes PowerShell scripts to administer a network may engage in behavior such as launching interactive or non-interactive PowerShell scripts, and launching PowerShell scripts in Hidden Mode, with or without policy or execution bias, and possibly with or without downloading external data and/or launching external processes. Thus, the threshold for suspicious behavior on the system administrator's device may be relatively high. Indeed, because the system administrator is expected to be a more savvy user with better security practices, her device may be more tolerant of suspicious behavior.

On the other hand, a secretary in human resources may primarily use office software such as word processors, spreadsheets, PowerPoint, and note-taking software. In her case, it would be very unusual for her to run an interactive PowerShell. Indeed, the only time PowerShell scripts may be expected to execute may be on start up, when new updates are installed, and automated scripts run to install the updates. Thus, the secretary in human resources may have a machine that is relatively more sensitive to suspicious behavior. In her case, launching an interactive PowerShell may be deemed per se suspicious, and the use of any special modes or flags would increase the suspicion. Thus, maintaining a static threshold across the enterprise to allow or block PowerShell processes may be suboptimal.

Threshold regulator 300 may be used to fine-tune the threshold, including the events or behavior during execution of a PowerShell that are logged, as well as saving associated scores for the endpoint. Thus, an analysis pipeline such as analysis pipeline 204 of FIG. 2 may work with a flexible threshold or set of thresholds that utilize the scores encountered in the past to fine-tune the threshold automatically. Fine-tuning the threshold may employ a number of algorithms, including machine learning algorithms. In an embodiment, scores and profiles may be tuned on a daily basis.

In an illustrative embodiment, data collected from an endpoint may include the following:

TABLE 9

Sample Data Set Collected From Endpoint

| Date | Time | Max Score | Threshold | Action Taken |
|---|---|---|---|---|
| 1 Mar. 2019 | 11:29:23 | 3 | 12 | Allow |
| 1 Mar. 2019 | 13:16:23 | 4 | 12 | Allow |
| 1 Mar. 2019 | 13:29:23 | 3 | 12 | Allow |
| 1 Mar. 2019 | 13:30:34 | 3 | 12 | Allow |
| 1 Mar. 2019 | 11:29:23 | 4 | 12 | Allow |
| 1 Mar. 2019 | | 4 | 12 | Allow |
| ... | ... | ... | ... | ... |
| 15 Mar. 2019 | 11:29:23 | 3 | 12 | Allow |
| 15 Mar. 2019 | 13:16:23 | 4 | 12 | Allow |
| ... | ... | ... | ... | ... |
| 17 Mar. 2019 | 13:29:23 | 3 | 12 | Allow |
| 17 Mar. 2019 | 13:30:34 | 3 | 12 | Allow |
| 17 Mar. 2019 | 11:29:23 | 4 | 12 | Allow |

A threshold regulator 300 includes new endpoint behavior logic 304. New endpoint behavior logic 304 identifies the endpoint as a new endpoint, or as an endpoint in need of updating, such as according to a daily scheduled task.

Machine learning algorithm 308 receives a set of events, as well as their associated scores or signatures across a time slice, such as across a single day, a week, a month, or a plurality of months. The time window may be selected so as to collect a sufficient number of events to make useful decisions, while not being so broad as to incorporate stale data that may have limited usefulness because of their age.

A machine learning algorithm 308 is only one example of an algorithm that may be used in a threshold regulator 300. Other algorithms may be used, such as algebraic algorithms, or other similar algorithms.

In one illustrative example, threshold regulator 300 uses an average predictor machine learning algorithm to determine the threshold of an endpoint. This algorithm may be characterized by:

$$\overline{X} = \frac{\sum x_i}{n} = \frac{x_1 + x_2 + \ldots x_n}{n}$$

Initially, the machine may have a threshold set at 12 after being trained on a system administrator's machine. The system administrator's machine may have a relatively high tolerance for suspicious behavior, and thus has a relatively high threshold. In that case, none of the events logged in the table above may trigger detection. However, once the machine learning algorithm has been trained on the new data set for this endpoint device, a new threshold may be calculated. The new threshold may be somewhere in the range of approximately 3 to 4. Assuming that the new threshold is set at 4, most of the events in the log still would not trigger detection. However, an event on Jan. 3, 2019 with a score of 5 would trigger detection. This score of 5 would be above the new threshold of 4. Thus, if a similar event occurs again, detection may be triggered on this endpoint.

The output of the machine learning algorithm 308 is provided to a classifier 312, which calculates a new threshold for this particular endpoint and/or enterprise. The new threshold is provided to a data set 316, which provides thresholds for endpoint behavior versus score mapping data.

A score threshold tuner 320 then adjusts the threshold for this specific endpoint, and provides an endpoint-specific threshold 324. This endpoint-specific threshold 324 may be provided to an endpoint security agent 328, which may include an analysis pipeline such as analysis pipeline 204, that uses the threshold in an attack detection phase such as attack detection phase 216.

In some embodiments, classifier 312 may also attempt to learn an endpoint user's behavior by predicting off-hours, when execution of a PowerShell is not expected. For example, a signature may start logging events aggressively and automatically reduce the threshold during off-hours. Off-hours may be determined based on data logged in the past. For example, in the case of the secretary in human resources, it may be very unusual for her to execute a PowerShell script at 1 o'clock in the morning when she is generally not at her machine. On the other hand, for a system administrator or programmer, it may be more common for her to execute a script at odd hours, because such power users are more likely to keep odd hours, and to execute more customized scripts.

Thus, in various embodiments, the threshold may be adjusted downward at certain off-peak hours for that endpoint or class of endpoints.

Once a threshold is decided, if deviation from the typical behavior profile exceeds a profile threshold, detection may be triggered.

In at least some embodiments, machine learning algorithm 308 may be local to the endpoint, itself.

Figure 4:
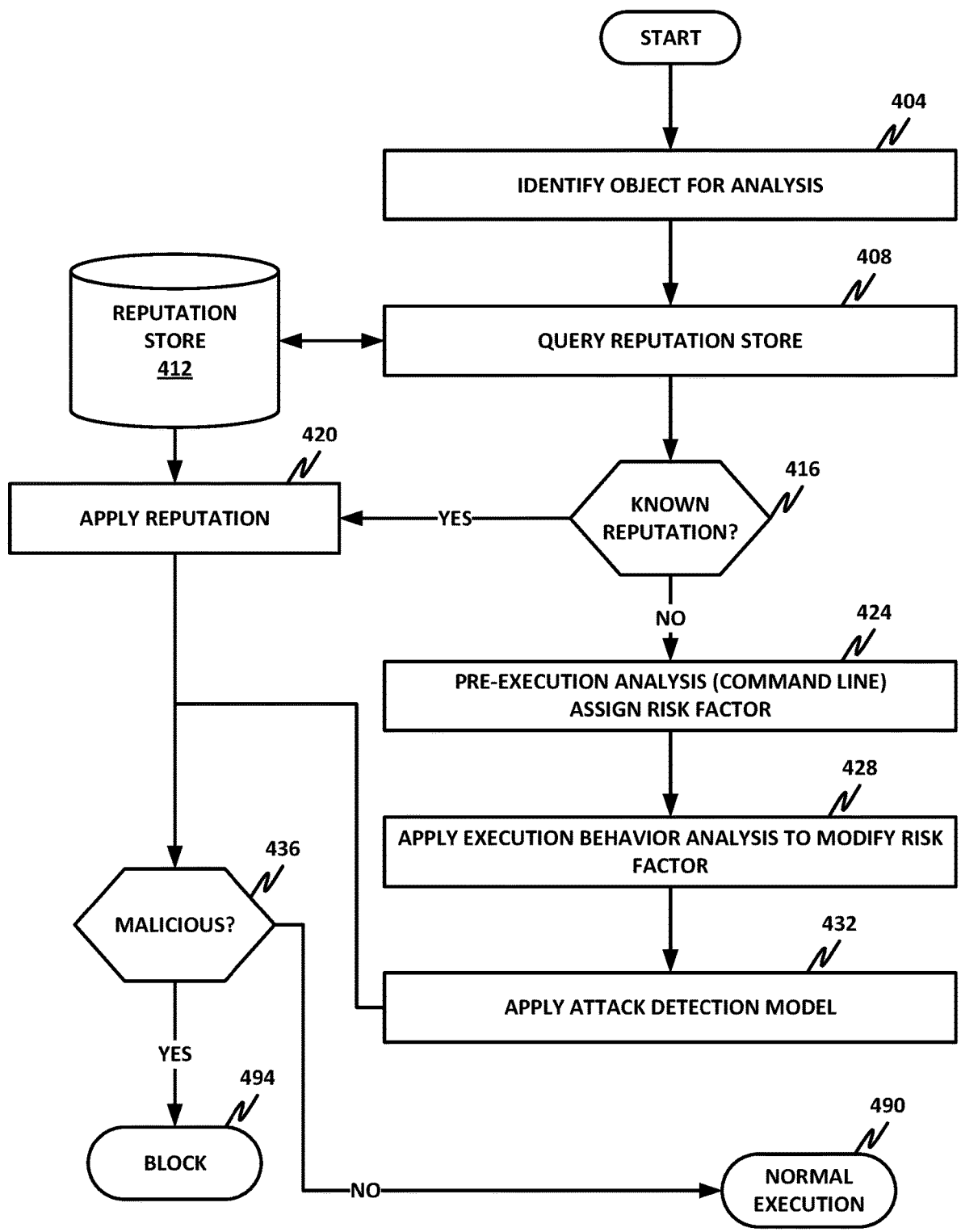
FIG. 4 is a flowchart of a method that may be performed by an endpoint security agent, and/or an enterprise security monitor.

FIG. 4 is a flowchart of a method 400. Method 400 may be performed by an endpoint security agent, and/or an enterprise security monitor to determine the suspiciousness of certain scripted activities.

In block 404, the security agent identifies a particular object for analysis. The object for analysis may be, for example, a scripted process such as a PowerShell script. A scripted process could also include a Unix or Linux shell script (e.g., Bash), an Apple or Macintosh shell script (e.g., Bourne), or other shell script.

In block 408, the security agent queries a reputation store 412 for a cached reputation for the object. For example, if the same script has been encountered by the enterprise before, it may have already been assigned a reputation.

If the object has a known reliable reputation 416, then in block 412, the security agent applies the reputation to the object.

Returning to decision block 416, the object may not have a known reliable reputation. Note that this could also include a case where the object has an intermediate or unreliable reputation. For example, the object may have been encountered before and assigned a signature or score. However, this may have been compared to an old threshold, and thus may not be considered a reliable reputation. A reliable reputation may, in some cases, be assigned only after the object has received additional scrutiny, such as via dynamic analysis, static analysis, deep static analysis, sandboxing, or other analysis. In other cases, the object may simply be new.

In block 424, the analysis pipeline subjects the object to pre-execution analysis of the command line. The pipeline may then assign an intermediate score to the object representing the command line analysis, such as the analysis of command line flags. As described above, in some examples this may be performed via generic mechanisms (such as API hooks) to make it difficult for a malware author to obfuscate the invocation of certain command line options.

In block 428, the analysis pipeline applies execution behavior analysis to modify the intermediate score computed in block 424. For example, the intermediate score block 424 may include a sum of scores for various command line options. In block 428, additional sums of scores of execution behaviors are also added.

In block 432, the analysis pipeline applies an attack detection model to the object under analysis.

Proceeding either from block 420 or from block 432, in block 436, the security agent determines whether the object is deemed malicious, according to the analysis pipeline or the cached reputation. If the object is not malicious, then in block 490, the object is permitted normal execution.

Returning to decision block 436, if the object is deemed malicious, then in block 494, the object is detected as malicious and may be blocked. Note that in other examples, intermediate thresholds may be applied for more granular decisions, such as determining that the object is suspicious or falls within a spectrum of suspiciousness. Various action may be taken in response to various grades of detection.

Figure 5:
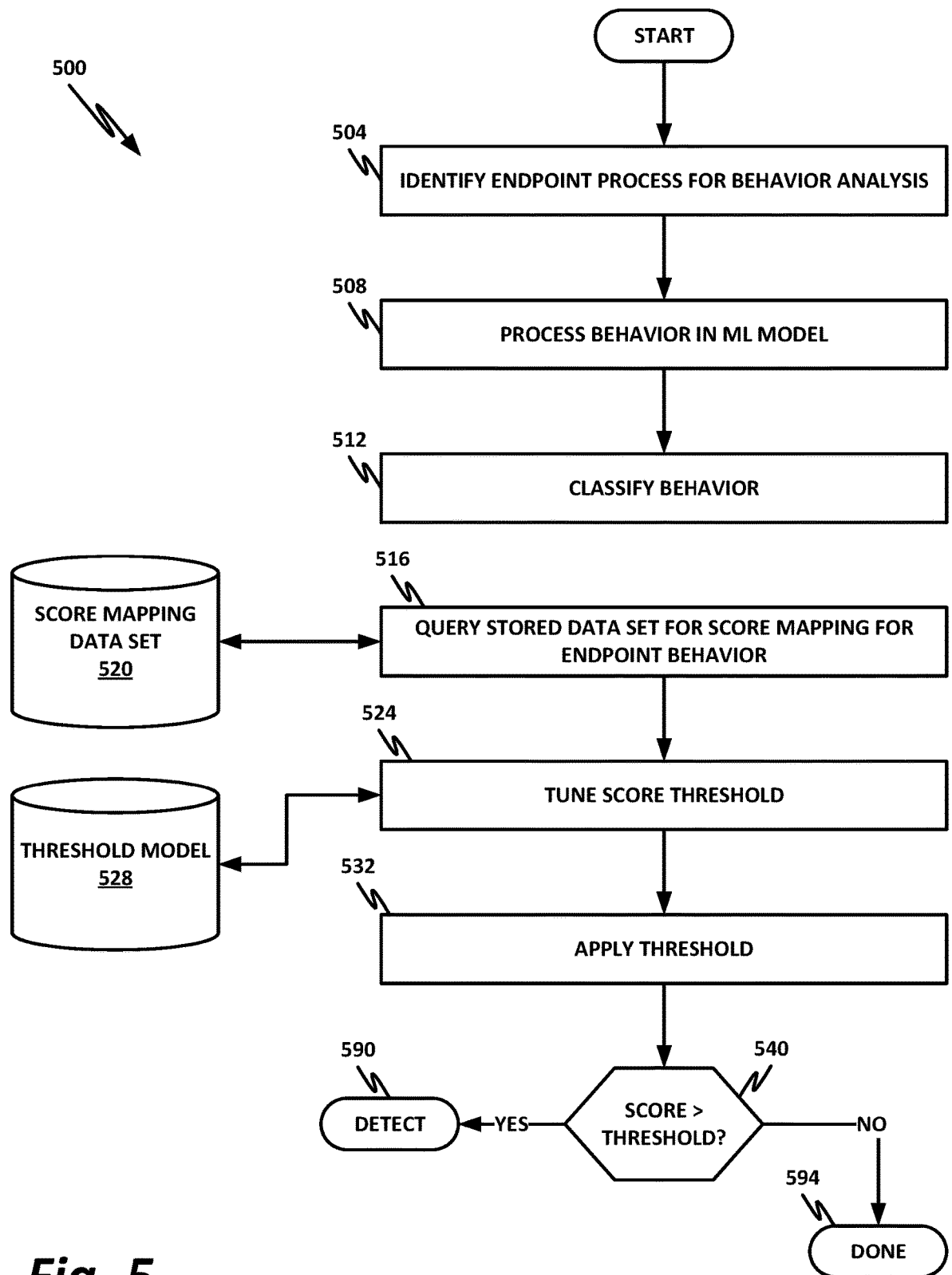
FIG. 5 is a flowchart of a method for tuning a score threshold for an endpoint, class of endpoints, enterprise, other individual device, or group of devices.

FIG. 5 is a flowchart of a method 500 for tuning a score threshold for an endpoint, class of endpoints, enterprise, other individual device, or group of devices.

In block 504, the threshold regulator identifies the endpoint or group of endpoints for threshold tuning. In at least some embodiments, this may be performed as a scheduled task, such as a daily task carried out during off-peak hours.

In block 508, the threshold regulator processes endpoint behavior in a machine learning model. This may include examining logs of scripted processes that have been executed on the endpoint, as well as observing the score or signature assigned to each process. This may also include observation of the factors that led to the score assignment. Furthermore, the data collected herein may be processed in a machine learning model.

In block 512, the threshold regulator may classify behavior. This can include working on both the overall threshold for detection, and on the score for individual events.

In block 516, the threshold regulator queries a stored data set 520 of score mappings for endpoint behavior.

In block 524, the threshold regulator tunes the score threshold to produce a new threshold model 528. Note that in some examples, tuning the score threshold may include not only tuning the overall threshold for detection, but may also include adjusting the score assigned to each individual factor, and even adding or removing factors from the list based on endpoint behavior.

In block 590, the method is done. The modified threshold may now be used by an analysis pipeline to better detect suspicious events on a particular endpoint or class of endpoints.

Figure 6:
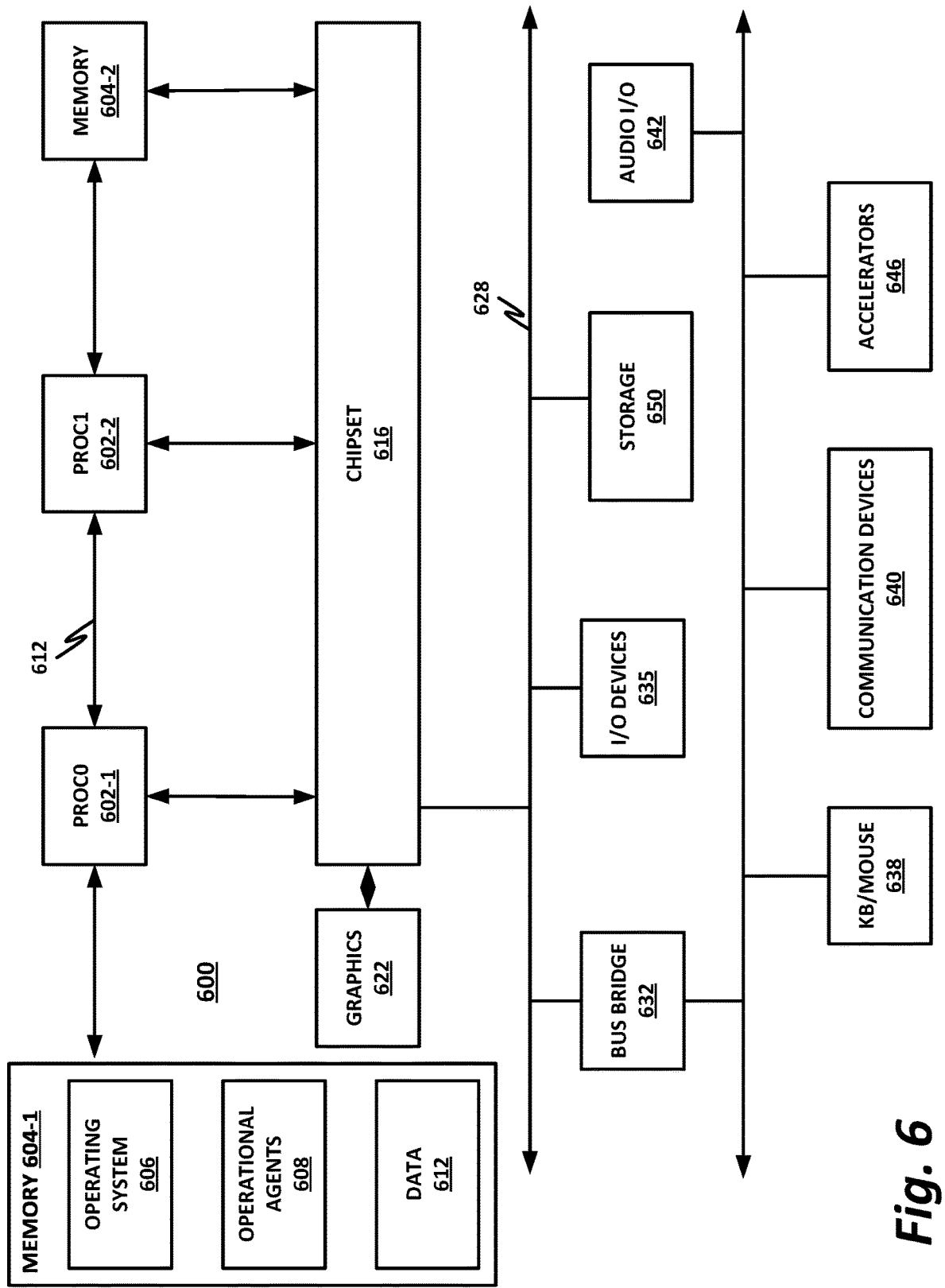
FIG. 6 is a block diagram of selected elements of a hardware platform.

FIG. 6 is a block diagram of a hardware platform 600. Embodiments of hardware platform 600 may be configured or adapted for providing detection of malicious scripted activity in fileless attacks, as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 600, even though they may be scattered across a data center, or even located in different data centers.

Hardware platform 600 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 600 is arranged in a point-to-point (PtP) configuration. This PtP configuration is popular for personal computer (PC) and server-type devices, although it is not so limited, and any other bus type may be used.

Hardware platform 600 is an example of a platform that may be used to implement embodiments of the teachings of this specification. For example, instructions could be stored in storage 650. Instructions could also be transmitted to the hardware platform in an ethereal form, such as via network interface 648, or retrieved from another source via any suitable interconnect. Once received (from any source), the instructions may be loaded into memory 604, and may then be executed by one or more processor 602 to provide elements such as an operating system 606, operational agents 608, or data 612.

Figure 8:
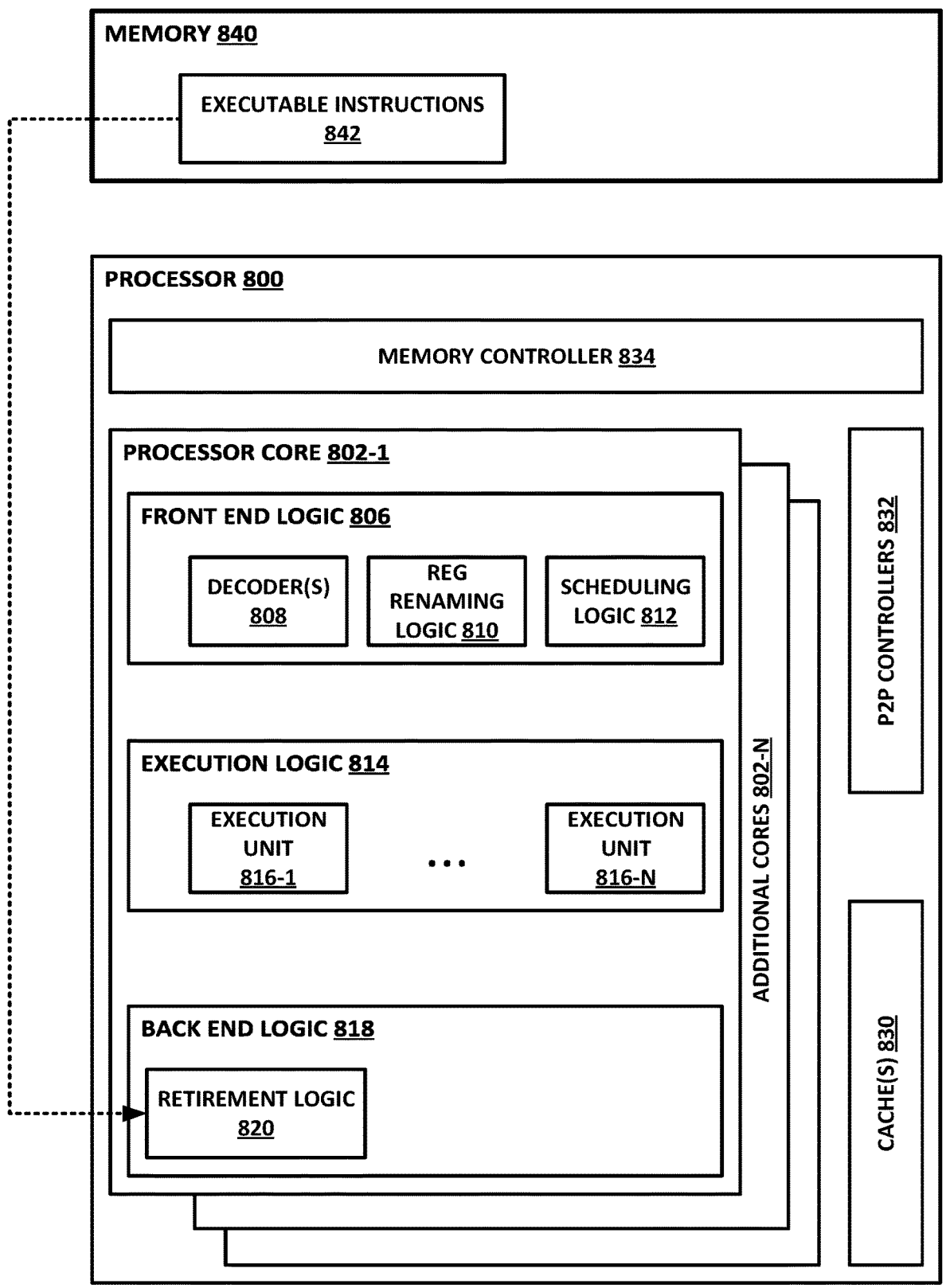
FIG. 8 is a block diagram of selected elements of a processor.

Hardware platform 600 may include several processors 602. For simplicity and clarity, only processors PROC0 602-1 and PROC1 602-2 are shown. Additional processors (such as 2, 4, 8, 16, 24, 32, 64, or 128 processors) may be provided as necessary, while in other embodiments, only one processor may be provided. Details of processors 602 are not illustrated in this FIGURE, but one embodiment is illustrated in FIG. 8. Processors may have any number of cores, such as 1, 2, 4, 8, 16, 24, 32, 64, or 128 cores.

Processors 602 may be any type of processor and may communicatively couple to chipset 616 via, for example, PtP interfaces. Chipset 616 may also exchange data with other elements, such as a high performance graphics adapter 622. In alternative embodiments, any or all of the PtP links illustrated in FIG. 6 could be implemented as any type of bus, or other configuration rather than a PtP link. In various embodiments, chipset 616 may reside on the same die or package as a central processing unit (CPU) 1012 or on one or more different dies or packages. Each chipset may support any suitable number of CPUs 602. A chipset 616 (which may be a chipset, uncore, Northbridge, Southbridge, or other suitable logic and circuitry) may also include one or more controllers to couple other components to one or more CPUs.

Two memories, 604-1 and 604-2 are shown, connected to PROC0 602-1 and PROC1 602-2, respectively. As an example, each processor is shown connected to its memory in a direct memory access (DMA) configuration, though other memory architectures are possible, including ones in which memory 604 communicates with processor 610 via a bus. For example, some memories may be connected via a system bus, or in a data center, memory may be accessible in a remote DMA (RDMA) configuration.

Memory 604 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 604 may be used for short, medium, and/or long-term storage. Memory 604 may store any suitable data or information utilized by platform logic. In some embodiments, memory 604 may also comprise storage for instructions that may be executed by the cores of CPUs 602 or other processing elements (e.g., logic resident on chipsets 616) to provide functionality.

In certain embodiments, memory 604 may comprise a relatively low-latency volatile main memory, while storage 650 may comprise a relatively higher-latency nonvolatile memory. However, memory 604 and storage 650 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 604 and storage 650, for example, in a single physical memory device, and in other cases, memory 604 and/or storage 650 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 622 may be configured to provide a human-readable visual output, such as a command line interface (CLI) or graphical desktop such as Microsoft Windows, Apple OSX desktop, or a Unix/Linux X Window System-based desktop. Graphics adapter 622 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 622 may include a hardware graphics card, which may have its own memory and its own graphics processing unit (GPU).

Chipset 616 may be in communication with a bus 628 via an interface circuit. Bus 628 may have one or more devices that communicate over it, such as a bus bridge 632, I/O devices 635, network interface 648, accelerators 646, communication devices 640, and a keyboard and/or mouse 638, by way of nonlimiting example. In general terms, the elements of hardware platform 600 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 640 can broadly include any communication not covered by network interface 648 and the various I/O devices described herein. This may include, for example, various universal serial bus (USB), FireWire, Lightning, or other serial or parallel devices that provide communications.

I/O Devices 635 may be configured to interface with any auxiliary device that connects to hardware platform 600 but that is not necessarily a part of the core architecture of hardware platform 600. A peripheral may be operable to provide extended functionality to hardware platform 600, and may or may not be wholly dependent on hardware platform 600. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 642 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 632 may be in communication with other devices such as a keyboard/mouse 638 (or other input devices such as a touch screen, trackball, etc.), communication devices 640 (such as modems, network interface devices, peripheral interfaces such as PCI or PCIe, or other types of communication devices that may communicate through a network), audio I/O devices 642, a data storage device 644, and/or accelerators 646. In alternative embodiments, any portions of the bus architectures could be implemented with one or more PtP links.

Operating system 606 may be, for example, Microsoft Windows, Linux, UNIX, Mac OS X, iOS, MS-DOS, or an embedded or real-time operating system (including embedded or real-time flavors of the foregoing). In some embodiments, a hardware platform 600 may function as a host platform for one or more guest systems that invoke application (e.g., operational agents 608).

Operational agents 608 may include one or more computing engines that may include one or more non-transitory computer-readable mediums having stored thereon executable instructions operable to instruct a processor to provide operational functions. At an appropriate time, such as upon booting hardware platform 600 or upon a command from operating system 606 or a user or security administrator, processor 602 may retrieve a copy of the operational agent (or software portions thereof) from storage 650 and load it into memory 604. Processor 610 may then iteratively execute the instructions of operational agents 608 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 648 may be provided to communicatively couple hardware platform 600 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 648 may include one or more physical ports that may couple to a cable (e.g., an Ethernet cable, other cable, or waveguide).

In some cases, some or all of the components of hardware platform 600 may be virtualized, in particular the processor(s) and memory. For example, a virtualized environment may run on OS 606, or OS 606 could be replaced with a hypervisor or virtual machine manager. In this configuration, a virtual machine running on hardware platform 600 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 7. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 7:
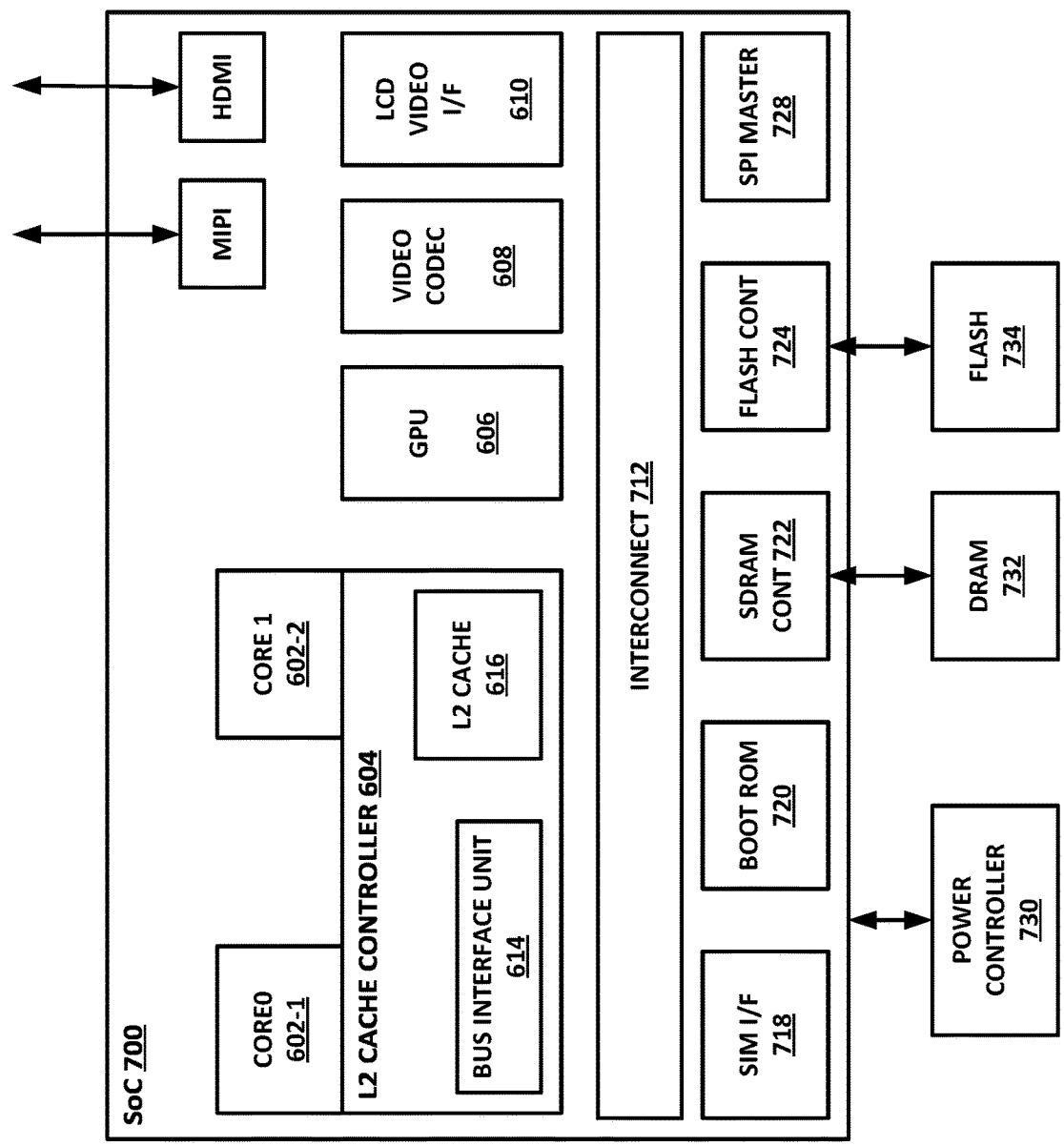
FIG. 7 is a block diagram of selected elements of a system-on-a-chip (SoC).

FIG. 7 is a block illustrating selected elements of an example SoC 700. Embodiments of SoC 700 may be configured or adapted for providing detection of malicious scripted activity in fileless attacks, as disclosed in the present specification.

At least some of the teachings of the present specification may be embodied on an SoC 700, or may be paired with an SoC 700. SoC 700 may include, or may be paired with, an advanced reduced instruction set computer machine (ARM) component. For example, SoC 700 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google *Nexus*, Microsoft Surface. SoC 700 could also be integrated into, for example, a PC, server, video processing components, laptop computer, notebook computer, netbook, or touch-enabled device.

As with hardware platform 600 above, SoC 700 may include multiple cores 702a and 702b. In this illustrative example, SoC 700 also includes an L2 cache control 704, a GPU 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/HDMI links that couple to an LCD.

SoC 700 may also include a subscriber identity module (SIM) I/F 718, a boot ROM 720, a synchronous dynamic random access memory (SDRAM) controller 722, a flash controller 724, a serial peripheral interface (SPI) master 728, a suitable power control 730, a dynamic RAM (DRAM) 732, and flash 734. In addition, one or more embodiments include one or more communication capabilities, interfaces, and features such as instances of Bluetooth™ 736, a 3G modem 738, a global positioning system (GPS) 740, and an 802.11 Wi-Fi 742.

Designers of integrated circuits such as SoC 700 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 8 is a block diagram illustrating selected elements of a processor 800. Embodiments of processor 800 may be configured or adapted for providing detection of malicious scripted activity in fileless attacks, as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 800 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 800 includes one or more processor cores 802, including core 802-1-802-N. Cores 802 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 800 may include at least one shared cache 830, which may be treated logically as part of memory 840. Caches 830 may be filled according to known caching techniques, and may store instructions and/or data that may be used by one or more components of processor 800.

Processor 800 may include an integrated memory controller (MC) 834, to communicate with memory 840. Memory controller 834 may include logic and circuitry to interface with memory 840, and may also include a cache controller to handle filling and evicting instructions and data to and from cache 830.

By way of example, each core 802 may include front-end logic 806, execution logic 814, and backend logic 818.

In the illustrated embodiment, front-end logic 806 includes an instruction decoder or decoders 808, register renaming logic 810, and scheduling logic 812. Decoder 808 may decode instructions received. Register renaming logic 810 may provide register renaming, for example to facilitate pipelining. Scheduling logic 812 may schedule instruction execution, and may provide out-of-order (OOO) execution. Front-end logic 806 may fetch incoming instructions, perform various processing (e.g., caching, decoding, branch predicting, etc.), and pass instructions to execution logic 814.

Execution logic 814 includes one or more execution units 816-1-816-N. Execution units 816 may include hardware instructions and microcode to carry out the provided instructions.

Backend logic 818 includes retirement logic 820. Core 802 may provide for speculative execution of instructions, branch prediction, and similar. Retirement logic 820 may be configured to determine which predicted instructions were actually needed by the program flow.

Processor 800 may also include a PtP controller 832, which enables connection to an uncore, chipset, Northbridge, Southbridge, or bus, by way of example.

Figure 9:
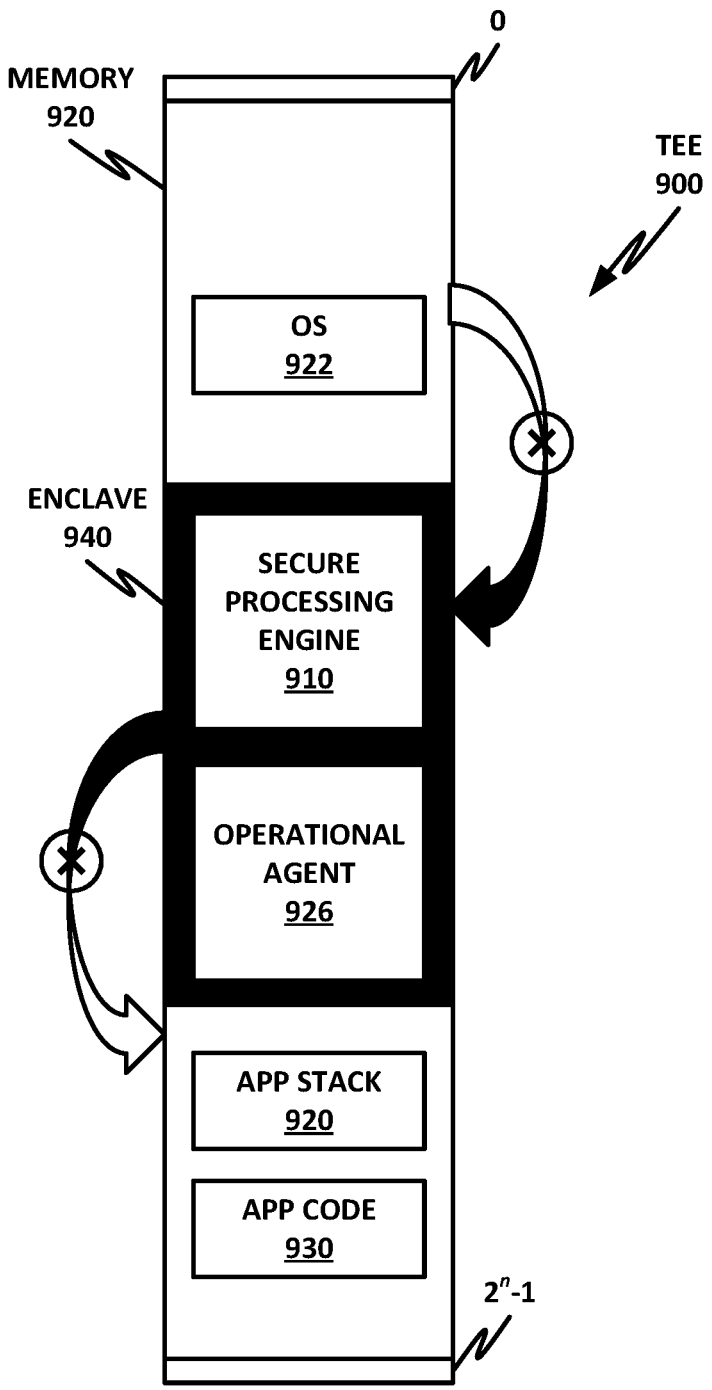
FIG. 9 is a block diagram of selected elements of a trusted execution environment (TEE).

FIG. 9 is a block diagram of a trusted execution environment (TEE) 900. Embodiments of TEE 900 may be configured or adapted for providing detection of malicious scripted activity in fileless attacks, as disclosed in the present specification.

In the example of FIG. 9, memory 920 is addressable by n-bits, ranging in address from 0 to $2^n-1$ (note, however, that in many cases, the size of the address space may far exceed the actual memory available). Within memory 920 is an OS 922, enclave 940, application stack 920, and application code 930.

In this example, enclave 940 is a specially-designated portion of memory 920 that cannot be entered into or exited from except via special instructions, such as Intel® Software Guard Extensions (SGX™) or similar. Enclave 940 is provided as an example of a secure environment which, in conjunction with a secure processing engine 910, forms a TEE 900 on a hardware platform such as platform 600 of FIG. 6. A TEE 900 is a combination of hardware, software, and/or memory allocation that provides the ability to securely execute instructions without interference from outside processes, in a verifiable way. By way of example, TEE 900 may include memory enclave 940 or some other protected memory area, and a secure processing engine 910, which includes hardware, software, and instructions for accessing and operating on enclave 940. Nonlimiting examples of solutions that either are or that can provide a TEE include Intel® SGX™, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 910 may be a user-mode application that operates via trusted execution framework 624 within enclave 940. TEE 900 may also conceptually include processor instructions that secure processing engine 910 and trusted execution framework 624 require to operate within enclave 940.

Secure processing engine 910 and trusted execution framework 624 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 922 may be excluded from TCB, in addition to the regular application stack 920 and application code 930.

In certain systems, computing devices equipped with Intel® SGX™ or equivalent instructions may be capable of providing an enclave 940. It should be noted, however, that many other examples of TEEs are available, and TEE 900 is provided only as one example thereof. Other secure environments may include, by way of nonlimiting example, a virtual machine, sandbox, testbed, test machine, or other similar device or method for providing a TEE 900.

In an example, enclave 940 provides a protected memory area that cannot be accessed or manipulated by ordinary computer instructions. Enclave 940 is described with particular reference to an Intel® SGX™ enclave by way of example, but it is intended that enclave 940 encompass any secure processing area with suitable properties, regardless of whether it is called an "enclave."

One feature of an enclave is that once an enclave region 940 of memory 920 is defined, as illustrated, a program pointer cannot enter or exit enclave 940 without the use of special enclave instructions or directives, such as those provided by Intel® SGX™ architecture. For example, SGX™ processors provide the ENCLU[EENTER], ENCLU [ERESUME], and ENCLU[EEXIT]. These are the only instructions that may legitimately enter into or exit from enclave 940.

Thus, once enclave 940 is defined in memory 604, a program executing within enclave 940 may be safely verified to not operate outside of its bounds. This security feature means that secure processing engine 910 is verifiably local to enclave 940. Thus, when an untrusted packet provides its content to be rendered with trusted execution framework 624 of enclave 940, the result of the rendering is verified as secure.

Enclave 940 may also digitally sign its output, which provides a verifiable means of ensuring that content has not been tampered with or modified since being rendered by secure processing engine 910. A digital signature provided by enclave 940 is unique to enclave 940 and is unique to the hardware of the device hosting enclave 940.

Figure 10:
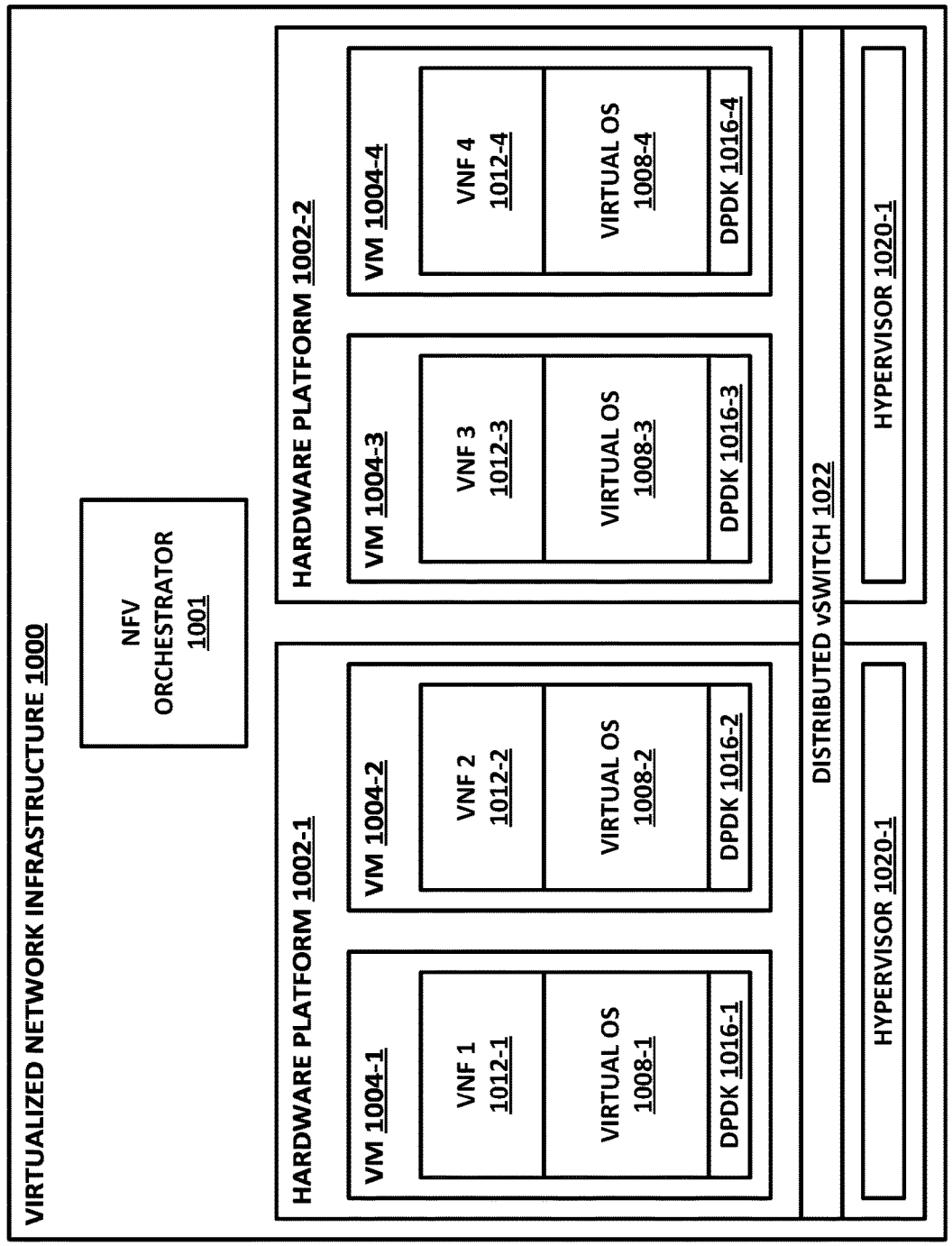
FIG. 10 is a block diagram of selected elements of a network function virtualization (NFV) infrastructure.

FIG. 10 is a block diagram of a network function virtualization (NFV) infrastructure 1000. Embodiments of NFV infrastructure 1000 may be configured or adapted for providing detection of malicious scripted activity in fileless attacks, as disclosed in the present specification.

NFV is an aspect of network virtualization that is generally considered distinct from, but that can still interoperate with, software-defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 10, an NFV orchestrator 1001 manages a number of the VNFs 1012 running on an NFVI 1000. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1001 a valuable system resource. Note that NFV orchestrator 1001 may provide a browser-based or graphical configuration interface, and in some embodiments may be integrated with SDN orchestration functions.

Note that NFV orchestrator 1001 itself may be virtualized (rather than a special-purpose hardware appliance). NFV orchestrator 1001 may be integrated within an existing SDN system, wherein an operations support system (OSS) manages the SDN. This may interact with cloud resource management systems (e.g., OpenStack) to provide NFV orchestration. An NFVI 1000 may include the hardware, software, and other infrastructure to enable VNFs to run. This may include a hardware platform 1002 on which one or more VMs 1004 may run. For example, hardware platform 1002-1 in this example runs VMs 1004-1 and 1004-2. Hardware platform 1002-2 runs VMs 1004-3 and 1004-4. Each hardware platform may include a hypervisor 1020, virtual machine manager (VMM), or similar function, which may include and run on a native (bare metal) operating system, which may be minimal so as to consume very few resources.

Hardware platforms 1002 may be or comprise a rack or several racks of blade or slot servers (including, e.g., processors, memory, and storage), one or more data centers, other hardware resources distributed across one or more geographic locations, hardware switches, or network interfaces. An NFVI 1000 may also include the software architecture that enables hypervisors to run and be managed by NFV orchestrator 1001.

Running on NFVI 1000 are a number of VMs 1004, each of which in this example is a VNF providing a virtual service appliance. Each VM 1004 in this example includes an instance of the Data Plane Development Kit (DPDK), a virtual operating system 1008, and an application providing the VNF 1012.

Virtualized network functions could include, as nonlimiting and illustrative examples, firewalls, intrusion detection systems, load balancers, routers, session border controllers, DPI services, network address translation (NAT) modules, or call security association.

The illustration of FIG. 10 shows that a number of VNFs 1004 have been provisioned and exist within NFVI 1000. This FIGURE does not necessarily illustrate any relationship between the VNFs and the larger network, or the packet flows that NFVI 1000 may employ.

The illustrated DPDK instances 1016 provide a set of highly-optimized libraries for communicating across a virtual switch (vSwitch) 1022. Like VMs 1004, vSwitch 1022 is provisioned and allocated by a hypervisor 1020. The hypervisor uses a network interface to connect the hardware platform to the data center fabric (e.g., an HFI). This HFI may be shared by all VMs 1004 running on a hardware platform 1002. Thus, a vSwitch may be allocated to switch traffic between VMs 1004. The vSwitch may be a pure software vSwitch (e.g., a shared memory vSwitch), which may be optimized so that data are not moved between memory locations, but rather, the data may stay in one place, and pointers may be passed between VMs 1004 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1022 is illustrated, wherein vSwitch 1022 is shared between two or more physical hardware platforms 1002.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications may be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computing apparatus, comprising: a processor and memory; and instructions encoded within the memory to instruct the processor to: identify a scripted process for security analysis; hook application programming interface (API) calls of the scripted process to determine a plurality of pre-execution parameters and runtime parameters; assign individual scores to the pre-execution parameters and runtime parameters; compute a sum of the individual scores; compare the sum to a threshold; and detect malicious or suspicious activity if the sum is above the threshold.

There is further disclosed an example computing apparatus, wherein the instructions are further to instruct the processor to adjust the threshold according to endpoint-specific usage.

There is further disclosed an example computing apparatus, wherein the instructions are further to instruct the processor to adjust the threshold according to enterprise-specific usage.

There is further disclosed an example computing apparatus, wherein the instructions are to adjust the threshold according to a machine learning algorithm.

There is further disclosed an example computing apparatus, wherein the machine learning algorithm is an average predictor algorithm.

There is further disclosed an example computing apparatus, wherein the instructions are further to adjust the threshold downward during off-peak computing hours.

There is further disclosed an example computing apparatus, wherein the instructions are to compute an intermediate score from pre-execution parameters, and to make an intermediate detection decision from the intermediate score.

There is further disclosed an example computing apparatus, wherein the intermediate detection comprises proceeding to computing runtime parameters if the intermediate score is between a lower threshold and an upper threshold.

There is further disclosed an example computing apparatus, wherein the instructions are to keep an event log of analyzed events with associated scores.

There is further disclosed an example computing apparatus, wherein the instructions are to cache a reputation for the scripted process.

There is further disclosed an example computing apparatus, wherein the instructions are to identify the scripted process for analysis only if the scripted process does not have a cached reliable reputation.

There is further disclosed an example computing apparatus, wherein the scripted process is a Windows PowerShell script.

There is also disclosed an example of one or more tangible, non-transitory computer-readable media having stored thereon executable instructions to instruct a processor to: determine that a script is to be subjected to an analysis pipeline; and provision an analysis pipeline for analysis of the script, the analysis pipeline comprising: a pre-execution phase to isolate pre-execution tokens of the script, and assign to the pre-execution tokens individual scores; an execution behavior phase to isolate runtime behavior tokens of the script, and assign to the runtime tokens individual scores; an attack detection phase to compute a signature comprising a sum of the individual scores, and to compare the signature to a detection threshold; and a decision phase to determine if the process should be detected as malicious or potentially malicious according to the comparing.

There is further disclosed an example of one or more tangible, non-transitory computer-readable media, wherein isolating the pre-execution tokens and isolating the runtime behavior tokens comprises inserting operating system application programming interface (API) hooks into APIs that provide the pre-execution tokens and runtime behavior tokens.

There is further disclosed an example of one or more tangible, non-transitory computer-readable media, wherein the instructions are further to provide a threshold regulator to adjust the threshold according to enterprise-specific usage.

There is further disclosed an example of one or more tangible, non-transitory computer-readable media, wherein the instructions are further to provide a threshold regulator to adjust the threshold according to endpoint-specific usage.

There is further disclosed an example of one or more tangible, non-transitory computer-readable media, wherein the threshold regulator is further to adjust individual token scores.

There is further disclosed an example of one or more tangible, non-transitory computer-readable media, wherein the threshold regulator comprises a machine learning algorithm to adjust the threshold.

There is further disclosed an example of one or more tangible, non-transitory computer-readable media, wherein the machine learning algorithm is an average predictor algorithm.

There is further disclosed an example of one or more tangible, non-transitory computer-readable media, wherein the instructions are to compute an intermediate score from pre-execution phase, and to make an intermediate detection decision from the intermediate score.

There is further disclosed an example of one or more tangible, non-transitory computer-readable media, wherein the intermediate detection comprises proceeding to execution behavior phase only if the intermediate score is between a lower threshold and an upper threshold.

There is further disclosed an example of one or more tangible, non-transitory computer-readable media, wherein the instructions are to keep an event log of analyzed events with associated scores.

There is further disclosed an example of one or more tangible, non-transitory computer-readable media, wherein the instructions are to cache a reputation for the scripted process.

There is further disclosed an example of one or more tangible, non-transitory computer-readable media, wherein the instructions are to identify the scripted process for analysis only if the scripted process does not have a cached reliable reputation.

There is further disclosed an example of one or more tangible, non-transitory computer-readable media, wherein the script is a Windows PowerShell script.

There is also disclosed an example computer-implemented method of detecting malicious scripts, comprising: identifying a script for analysis in a script analysis pipeline; and in a pre-execution phase, hooking operating system application programming interfaces (APIs) that provide command line configuration tokens, detecting invoked APIs, and assigning individual scores to the invoked APIs; in an execution behavior phase, hooking operating system APIs that provide runtime behaviors, detecting invoked APIs, and assigning individual scores to the invoked APIs; in an attack detection phase, assigning a composite score to the script comprising a sum of the individual scores, comparing the composite score to a flexible threshold, and detecting the script if the composite score is above the flexible threshold.

There is further disclosed an example computer-implemented method, further comprising providing a threshold regulator to adjust the threshold according to enterprise-specific usage.

There is further disclosed an example computer-implemented method, further comprising providing a threshold regulator to adjust the threshold according to endpoint-specific usage.

There is further disclosed an example computer-implemented method, further comprising individual token scores.

There is further disclosed an example computer-implemented method, wherein the threshold regulator comprises a machine learning algorithm.

There is further disclosed an example computer-implemented method, wherein the machine learning algorithm is an average predictor algorithm.

There is further disclosed an example computer-implemented method, further comprising computing an intermediate score from pre-execution phase, and to make an intermediate detection decision from the intermediate score.

There is further disclosed an example computer-implemented method, wherein the intermediate detection comprises proceeding to execution behavior phase only if the intermediate score is between a lower threshold and an upper threshold.

There is further disclosed an example computer-implemented method, further comprising keeping an event log of analyzed events with associated scores.

There is further disclosed an example computer-implemented method, further comprising caching a reputation for the scripted process.

There is further disclosed an example computer-implemented method, further comprising identifying the script for analysis only if the script does not have a cached reliable reputation.

There is further disclosed an example computer-implemented method, wherein the script is a Windows PowerShell script.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

What is claimed is:

1. A computing endpoint, comprising:
   a processor and memory; and
   instructions encoded within the memory to instruct the processor to:
   identify a scripted process for security analysis, wherein the scripted process comprises a command-line invocation of a process with parameters;
   hook application programming interface (API) calls of the scripted process to determine a plurality of pre-execution parameters and runtime parameters;
   assign individual scores to the pre-execution parameters and runtime parameters;
   compute a sum of the individual scores;
   compare the sum to an endpoint-specific threshold, wherein the endpoint-specific threshold is based on usage of the endpoint; and
   based on determining that the sum is above the threshold, detect malicious or suspicious activity.

2. The computing apparatus of claim 1, wherein the instructions are further to instruct the processor to adjust the threshold according to enterprise-specific usage.

3. The computing apparatus of claim 1, wherein the instructions are further to instruct the processor to adjust the threshold according to endpoint-specific usage.

4. The computing apparatus of claim 3, wherein the instructions are to adjust the threshold according to a machine learning algorithm.

5. The computing apparatus of claim 4, wherein the machine learning algorithm is an average predictor algorithm.

6. The computing apparatus of claim 3, wherein the instructions are further to adjust the threshold downward during off-peak computing hours.

7. The computing apparatus of claim 1, wherein the instructions are to compute an intermediate score from pre-execution parameters, and to make an intermediate detection decision from the intermediate score.

8. The computing apparatus of claim 7, wherein the intermediate detection comprises proceeding to computing runtime parameters based on determining that the intermediate score is between a lower threshold and an upper threshold.

9. The computing apparatus of claim 1, wherein the instructions are to keep an event log of analyzed events with associated scores.

10. The computing apparatus of claim 1, wherein the instructions are to cache a reputation for the scripted process.

11. The computing apparatus of claim 1, wherein the instructions are to identify the scripted process for analysis only based on determining that the scripted process does not have a cached reliable reputation.

12. The computing apparatus of claim 1, wherein the scripted process is a Windows PowerShell script.

13. One or more tangible, non-transitory computer-readable media having stored thereon executable instructions to instruct a processor to:
    determine that a script is to be subjected to an analysis pipeline, the script comprising a process with execution parameters; and
    provision an analysis pipeline for analysis of the script, the analysis pipeline comprising:
    a pre-execution phase to isolate the execution parameters, and assign to the execution parameters individual scores;
    an execution behavior phase to isolate runtime behavior tokens of the script, and assign to the runtime tokens individual scores;
    an attack detection phase to compute a signature comprising a sum of the individual scores, and to compare the signature to a detection threshold specific to an endpoint or enterprise, wherein the threshold is based on usage patterns within the endpoint or enterprise; and
    a decision phase to detect the process as malicious or potentially malicious based on the comparing.

14. The one or more tangible, non-transitory computer-readable media of claim 13, wherein isolating the execution parameters and isolating the runtime behavior tokens comprises inserting operating system application programming interface (API) hooks into APIs that provide the execution parameters and runtime behavior tokens.

15. The one or more tangible, non-transitory computer-readable media of claim 13, wherein the instructions are further to provide a threshold regulator to adjust the detection threshold according to enterprise-specific usage.

16. The one or more tangible, non-transitory computer-readable media of claim 13, wherein the instructions are further to provide a threshold regulator to adjust the detection threshold according to endpoint-specific usage.

17. The one or more tangible, non-transitory computer-readable media of claim 15, wherein the threshold regulator is further to adjust individual token scores.

18. The one or more tangible, non-transitory computer-readable media of claim 15, wherein the threshold regulator comprises a machine learning algorithm to adjust the detection threshold.

19. A computer-implemented method of detecting malicious scripts, comprising:
    identifying a script for analysis in a script analysis pipeline, the script comprising a process and execution parameters; and
    in a pre-execution phase, hooking operating system application programming interfaces (APIs) that provide the execution parameters, detecting invoked APIs, and assigning individual scores to the execution parameters;
    in an execution behavior phase, hooking operating system APIs that provide runtime behaviors, detecting invoked APIs, and assigning individual scores to the invoked APIs;
    in an attack detection phase, assigning a composite score to the script comprising a sum of the individual scores, comparing the composite score to a flexible threshold specific to an endpoint, wherein the flexible threshold is based on usage or expected usage of the endpoint, and detecting the script based on determining that the composite score is above the flexible threshold.

20. The computer-implemented method of claim 19, further comprising providing a threshold regulator to adjust the flexible threshold according to enterprise-specific usage.

* * * * *

UNITED STATES PATENT AND TRADEMARK OFFICE
CERTIFICATE OF CORRECTION

| | |
|---|---|
| PATENT NO. | : 11,630,900 B2 |
| APPLICATION NO. | : 16/588159 |
| DATED | : April 18, 2023 |
| INVENTOR(S) | : Debasish Mandal and Abhishek Karnik |

It is certified that error appears in the above-identified patent and that said Letters Patent is hereby corrected as shown below:

In the Drawings

Sheet 7 of 10, in "Fig. 7", delete "CORE0 602-1" and insert -- CORE0 702a --, therefor.

Sheet 7 of 10, in "Fig. 7", delete "CORE1 602-2" and insert -- CORE1 702b --, therefor.

Sheet 7 of 10, in "Fig. 7", delete "L2 CACHE CONTROLLER 604" and insert -- L2 CACHE CONTROLLER 704 --, therefor.

Sheet 7 of 10, in "Fig. 7", delete "BUS INTERFACE UNIT 614" and insert -- BUS INTERFACE UNIT 714 --, therefor.

Sheet 7 of 10, in "Fig. 7", delete "L2 CACHE 616" and insert -- L2 CACHE 716 --, therefor.

Sheet 7 of 10, in "Fig. 7", delete "CPU 606" and insert -- CPU 706 --, therefor.

Sheet 7 of 10, in "Fig. 7", delete "VIDEO CODEC 608" and insert -- VIDEO CODEC 708 --, therefor.

Sheet 7 of 10, in "Fig. 7", delete "LCD VIDEO I/F 610" and insert -- LCD VIDEO I/F 710 --, therefor.

Signed and Sealed this
Thirtieth Day of January, 2024

*Katherine Kelly Vidal*
Katherine Kelly Vidal
*Director of the United States Patent and Trademark Office*